United States Patent [19]
Piel, Jr. et al.

[11] Patent Number: 4,984,465
[45] Date of Patent: Jan. 15, 1991

[54] ULTRASOUND IMAGING SYSTEM WITH COMMON-MODE NOISE REJECTION PROBE

[75] Inventors: Joseph E. Piel, Jr., Scotia; Lowell S. Smith, Schenectady, both of N.Y.

[73] Assignee: General Electric Company, Schenectady, N.Y.

[21] Appl. No.: 445,521

[22] Filed: Dec. 4, 1989

[51] Int. Cl.$^5$ ............................................. G01N 29/04
[52] U.S. Cl. ........................................ 73/602; 73/625
[58] Field of Search .................. 73/602, 626, 625, 613

[56] References Cited
U.S. PATENT DOCUMENTS
4,420,978 12/1983 Robinson et al. ...................... 73/643

Primary Examiner—Hezron E. Williams
Assistant Examiner—William Frances
Attorney, Agent, or Firm—Marvin Snyder; James C. Davis, Jr.

[57] ABSTRACT

An ultrasonic imaging system probe with an even-number of transducer elements, has a transformer for coupling the received signal from each transducer to an associated cable. The polling of the transformer primary windings are identical while the polling of the secondary windings of the transformer alternate, i.e. are reversed for all even-numbered channels, with respect to odd-numbered channels. All odd channel outputs are conected to a first signal bus, while all even channel outputs are connected to a second signal bus. The signal busses are connected to inputs of a differential-input amplifier, having an output which provides the sum of all channel transducer outputs, with suppression of any common-mode signal appearing in the system from the channel transformer secondary windings to the differential amplifier inputs.

10 Claims, 1 Drawing Sheet

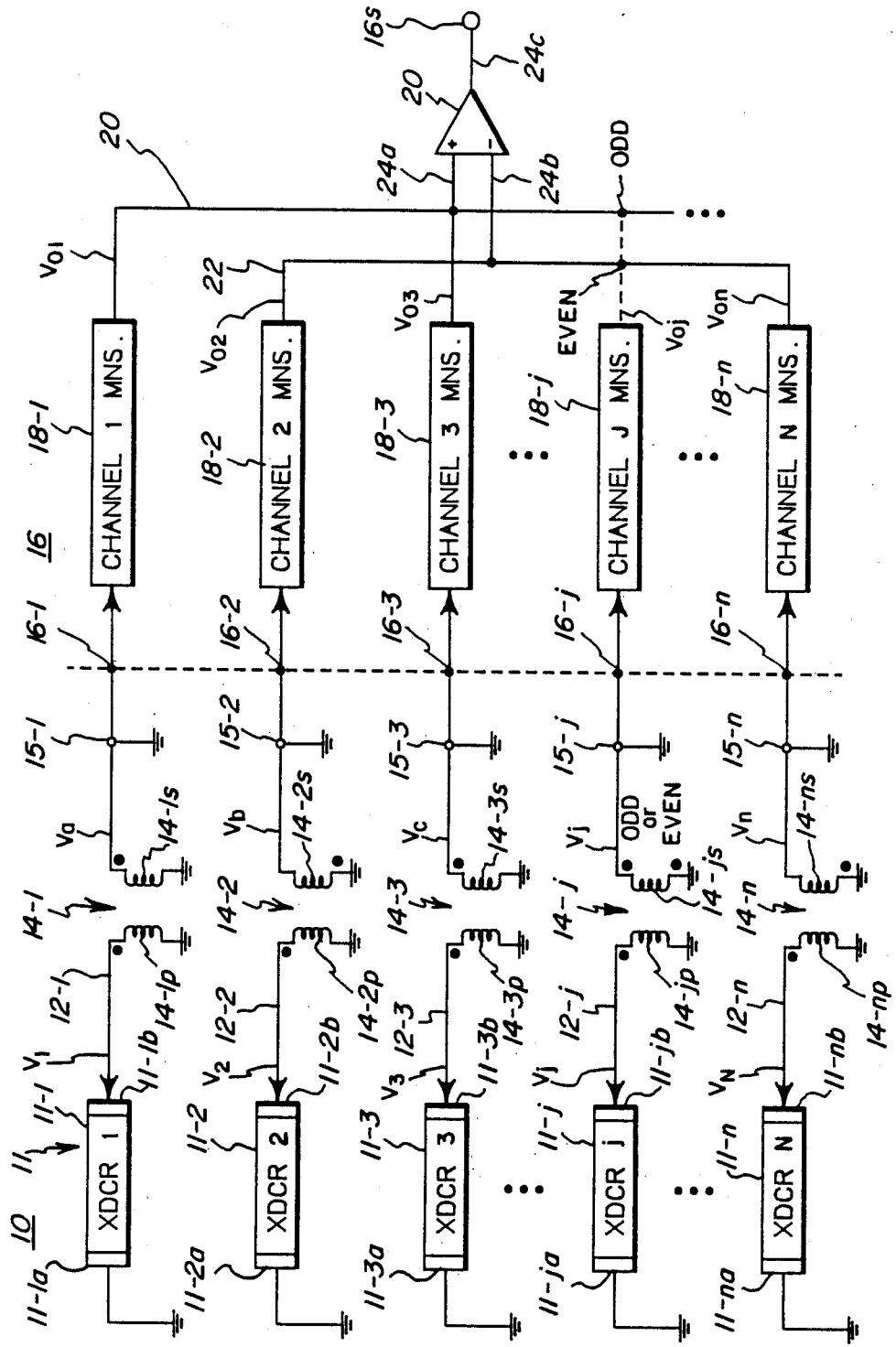

ULTRASOUND IMAGING SYSTEM WITH COMMON-MODE NOISE REJECTION PROBE

BACKGROUND OF THE INVENTION

The present invention relates to ultrasonic imaging systems and, more particularly, to a novel ultrasound imaging system with a probe having increased rejection of common-mode noise.

Ultrasonic array imagers form viewable display images from a coherent summation of many individual channel signals. The instantaneous dynamic range of each of these signals often exceeds 60dB. For example, a very high instantaneous dynamic range may be required for processing the reflected ultrasonic signal from a blood cell, compared to the reflected signal from calcified plaque, in a blood vessel. Because the coherent sum must be accurately performed, even with high instantaneous dynamic signal range, individual signals must be combined with accurate time/phase delay so that both the maxima and minima (nulls) are faithfully produced. If there is any common-mode "noise" (i.e. undesired signal) present, the system dynamic range will be reduced, due to the degradation of the coherent sum maxima and the more serious degradation of minima (where destructive interference should occur) so that the clinical utility of the resulting image is reduced. Typically, such common-mode noise can be found in ultrasonic systems due to electromagnetic pickup of extraneous signals from the environment. In fact, it is often the ultrasonic imaging system which itself creates an environment with a significant amount of radiated energy for common-mode pickup, due to various system portions (such as local oscillators, signal processing circuits, video display circuits and the like) radiating energy in the ultrasonic signal bandwidth. While efficient shielding is desirable, it is often difficult to achieve, so that there is always some amount of common-mode electromagnetic noise pickup. Often this noise is picked up through the ultrasonic transducer probe which, having many relatively high impedance (typically greater than 100 ohm) transducer elements each coupled to a long (6–10 feet) cable of somewhat lower impedance (typically less than 80 ohms), allows each probe to act as an antenna for electromagnetic signals. Since the personnel utilizing the ultrasonic imaging system prefer a probe having relatively low mass and highly flexible cables, good electromagnetic shielding of the probe/cable assembly is difficult to implement.

While it has been proposed to alternate signal phase in the ultrasonic receiver electronics channels, in order to minimize common-mode noise, the typical implementation thereof utilizes an amplifier, with either a differential input or a differential output, so that signals from adjacent channels are connected to opposite sides of the differential devices. Such a system fails to suppress common-mode noise pickup ahead of the differential amplifiers. It is highly desirable to provide an ultrasonic imaging system probe having common-mode noise rejection prior to the probe/cable interface to the imaging system channel electronics.

BRIEF SUMMARY OF THE INVENTION

In accordance with the present invention, an ultrasonic imaging system has a probe with an even-numbered plurality N of transducer elements, with one transducer element being present in each of a like plurality N of signal-processing channels, and one of a like plurality N of transformer means for coupling the received signal from each associated transducer to an associated cable, for connection to the associated channel signal processing means. The polling of the transformer primary windings are identical while the polling of the secondary windings of the transformer are reversed for all even-numbered channels, with respect to odd-numbered channels. The processed outputs of all odd channels are connected to a first signal bus, while the processed outputs of all even channels are connected to a second signal bus. The first signal bus is connected to a first input of a differential-input amplifier, having a second input receiving the signals from the other output bus. The differential amplifier output provides the sum of all channel transducer outputs, with suppression of any commonmode signal appearing in the system from the channel transformer secondary windings to the differential amplifier inputs.

Accordingly, it is an object of the present invention to provide a novel common-mode-noise-reducing probe for an ultrasonic imaging system.

This and other objects of the present invention will become apparent upon reading the following detailed description of a presently preferred embodiment, when considered in conjunction with the drawing.

BRIEF DESCRIPTION OF THE DRAWINGS

The sole figure is a schematic block diagram of a portion of an ultrasonic imaging system, in which the present invention is applied.

DETAILED DESCRIPTION OF THE INVENTION

Referring to the sole figure, in an ultrasonic imaging system, a probe 10 includes an array 11 of an even number N of transducers 11-1 through 11-n. Each transducer has a first electrode 11-1a through 11-na which is maintained at system ground potential, and has an opposite electrode 11-1b through 11-nb, each of which is connected through associated wiring means 12-1 through 12-n, through one of a like plurality N of signal transformer means 14-1 through 14-n, and thence through a shielded cable 15-1 through 15-n, to an associated separate input 16-1 through 16-n of the main ultrasonic imaging equipment 16. As is well known in the art, an ultrasonic interrogation pulse is formed by each of a like plurality N of separate transmission pulses each gated to the associated transducer, for conversion of the electrical energy therein to ultrasonic energy. As is also well known, the return signal is converted back to electrical energy, with each of the N separate signals appearing as a received signal present at coupling means 12-1 through 12-n and at the transformer 14-1 through 14-n.

In accordance with the invention, each transformer has a primary winding 14-1p through 14-np, coupled to a secondary winding 14-1s through 14-ns, with a winding polarity ("polling") which alternates such that the signal across the secondary winding from the channel transducer in each of the even-numbered channels 2, . . . , N is inverted from its original polarity, while the signal in each of the odd-numbered channels 1, 3, . . . is not inverted. The total signal $V_j$ across each transformer secondary winding 14-js is the sum of the signal $V_J$ received by the transducer 11-j for that channel, plus whatever common-mode signal $V_{cmp}$ is picked up by the entire preceding "antenna" provided by the channel transducer 11-j, coupling means 12-j, signal transformer primary winding 14-jp, and the like, with or without inversion (dependent upon whether an odd-numbered or evennumbered channel is being considered). The common-mode signal components $V_{cmp}$, referred to the primary winding, in all channels are of similar amplitude, frequency and phase characteristics. But because they are produced before the transformers 14-j, these signals will not be suppressed.

Common mode signals $V_{cms}$ picked up by the cables 15-1 through 15-n and in signal processing means 18-1 through 18-n, will be cancelled.

Each channel signal, composed of the desired response signal and the undesired common-mode ("noise") signal contribution $V_{cmp}$, is transmitted through the associated channel cable 15-j to the end of the probe/cable assembly, at the associated channel input 16-j of the main ultrasonic imaging system equipment 16. Each input signal is operated upon ("processed") by the associated channel J means 18-j to provide a channel output signal $V_{oj}$. The output of each odd-numbered channel means 18, i.e. the output of channel means 18-1, 18-3, . . . , 18-j, . . . (where j is an odd number) is connected to a first summing signal bus 20. Thus, appearing on bus 20 is the sum of output signals $V_{o1}, V_{o3}, \ldots, V_{oj}, \ldots$ or $V_{20} = V_{o1} + V_{o3} + \ldots + V_{oj} + \ldots$ for all odd-numbered j channels. This first sum $V_{20} = (V'_1 + V'_{cmp} + V'_{cms}) + (V'_3 + V'_{cms}) + \ldots + (V'_j + V'_{cmp} + V'_{cms}) + \ldots$, where $V'_j$ is the processed channel transducer signal, $V'_{cmp}$ is the processed common-mode signal picked up in each channel prior to the transformer secondary winding; and $V'_{cms}$ is the processed common-mode signal from after the channel transformer secondary winding on to the summation bus. Since the common mode signal $V'_{cm}$ is substantially identical for all channels, the $V_{20}$ signal is substantially given by $$V_{20} = \left(\sum_{i=1}^{N/2} V'_{2i-1}\right) + (N/2)V'_{cmp} + (N/2)V'_{cms}.$$

Similarly, the output of each of the even-numbered channel means 18-2, 18-4, . . . , 18-n is connected to a second signal summation bus 22. Thus, the second sum signal $$V_{22} = \left(\sum_{i=1}^{N/2} - V'_{2i}\right) + (N/2)V'_{cms} - (N/2)V'_{cmp}$$

where the negative polarity of each $V'_{2i}$ and $V'_{cmp}$ term is due to the reversal of polarity in the channel transformer 14, since each received signal $V_2, V_4, \ldots$ and each common-mode $V_{cmp}$ signal is inverted before being added to the other common-mode voltage $V_{cms}$ at each even-numbered signal node $V_b, V_d, \ldots, V_j, \ldots V_n$.

The first summation signal bus 20 is connected to a first, non-inverting input (+) 24a of a differential amplifier 24, having a second, inverting (−) input 24b receiving the signal on second summation bus 22. The signal at the differential amplifier output 24c, which is the coherent summation signal at an intermediate output 16s of the system (further signal processing portions of the systems not being shown herein), is $$V_{16s} = \sum_{i=1}^{N/2}(V_{2i-1} - (-V_{2i})) + \frac{N}{2}V_{cms} - \frac{N}{2}V_{cms} +$$

$$\frac{N}{2}V_{cmp} - \left(\frac{N}{2}\right)(-V_{cmp})$$

and at least the common-mode undesired signals $V'_{cms}$, due to pickup after each channel transformer 14, cancel to give $$V_{16s} = \sum_{i=1}^{N/2}(V_{2i-1} + V_{2i}) + NV_{cmp} = \sum_{i=1}^{N} V_i + NV_{cmp}.$$

for all common-mode signals having frequencies sufficiently less than the reciprocal of any differential time delays introduced into the various channel means 18. For example, in a typical ultrasonic imaging system wherein reception beam forming is accomplished through the introduction of channel time delays on the order of up to tens of microseconds, common mode signals having a maximum frequency on the order of 1 kilohertz are greatly reduced, and even signals having a somewhat higher frequency can undergo suppression.

While several presently preferred embodiments of our novel invention have been described in detail herein, many modifications and variations will now become apparent to those skilled in the art. For example, while the invention is shown as used in an analog system, it will be understood that use is also possible in digital form; summation of digital signals, after analog-to-digital conversion and digital processing, will provide the desired common-mode signal cancellation. It is our intent, therefore, to be limited only by the scope of the appending claims and not by the specific details and instrumentalities presented by way of explanation herein.

What we claim is:

1. An ultrasonic imaging system, comprising:
   an even-numbered plurality N of transducers, each assigned to a like-numbered one of a plurality of channels;
   a like plurality of signal transformers, each assigned to one of said channels and having a primary winding receiving a return signal from the associated channel transducer and a secondary winding, the polling of said secondary winding, with respect to said primary winding, alternating in sequential channels;
   channel means for separately processing each secondary winding signal; and
   means for subtracting a sum of all processed signals for all even-numbered channels from a sum of all processed signals for all odd-numbered channels, to cause all transducer signals to be summed while undesired signals commonly present between said secondary windings and said subtractor means substantially cancel.

2. The system of claim 1, wherein the polling of all signal transformers in even-numbered channels causes polarity inversion of the transducer signal in that channel.

3. The system of claim 2, wherein said subtracting means comprises a differential-input amplifier receiving the even-numbered-channels sum at an inverting input and receiving the odd-numbered-channels sum at a non-inverting input.

4. The system of claim 3, further comprising first and second signal bus means, each receiving all processed signals from a respective one of the odd-numbered and even-numbered channels, for forming the respective odd-numbered-channels sum and even-numbered-channels sum.

5. The system of claim 2, wherein said subtracting means comprises a differential-input amplifier receiving the odd-numbered-channels sum at an inverting input and receiving the even-numbered-channels sum at an inverting input.

6. The system of claim 5, further comprising first and second signal bus means, each receiving all processed signals from a respective one of the even-numbered and odd-numbered channels, for forming the respective even-numbered-channels sum and odd-numbered-channels sum.

7. The system of claim 1, wherein said subtracting means comprises a differential-input amplifier receiving the even-numbered-channels at an inverting input and receiving the odd-numbered-channels sum at a non-inverting input.

8. The system of claim 7, further comprising first and second signal bus means, each receiving all processed signals from a respective one of the odd-numbered and even-numbered channels, for forming the respective odd-numbered-channels sum and even-numbered-channels sum.

9. The system of claim 1, wherein said subtracting means comprises a differential-input amplifier receiving the odd-numbered-channels at an inverting input and receiving the even-numbered-channels sum at a non-inverting input.

10. The system of claim 9, further comprising first and second signal bus means, each receiving all processed signals from a respective one of the even-numbered and odd-numbered channels, for forming the respective even-numbered-channels sum and odd-numbered-channels sum.

* * * * *